June 17, 1941.　　　H. A. DAVIS　　　2,246,127
VEHICLE BRAKING SYSTEM
Filed July 18, 1940

Inventor:
Horace A. Davis,
by Harry E. Dunham
His Attorney.

Patented June 17, 1941

2,246,127

UNITED STATES PATENT OFFICE 2,246,127

VEHICLE BRAKING SYSTEM

Horace A. Davis, Larchmont, N. Y., assignor to General Electric Company, a corporation of New York Application July 18, 1940, Serial No. 346,156

3 Claims. (Cl. 303—3)

My invention relates to vericle braking systems and more particularly to such systems in which the braking effect is produced by the operation of an electrodynamic brake combined with a spring-applied friction brake.

One object of my invention is to provide an improved interlocking system between an electrodynamic brake and a friction brake so that a quick application of the friction brake is effected when the braking effect of the electrodynamic brake decreases below a predetermined value.

Another object of my invention is to provide an improved control arrangement for a spring-applied friction brake so that it may be readily applied and released.

Figure 1:
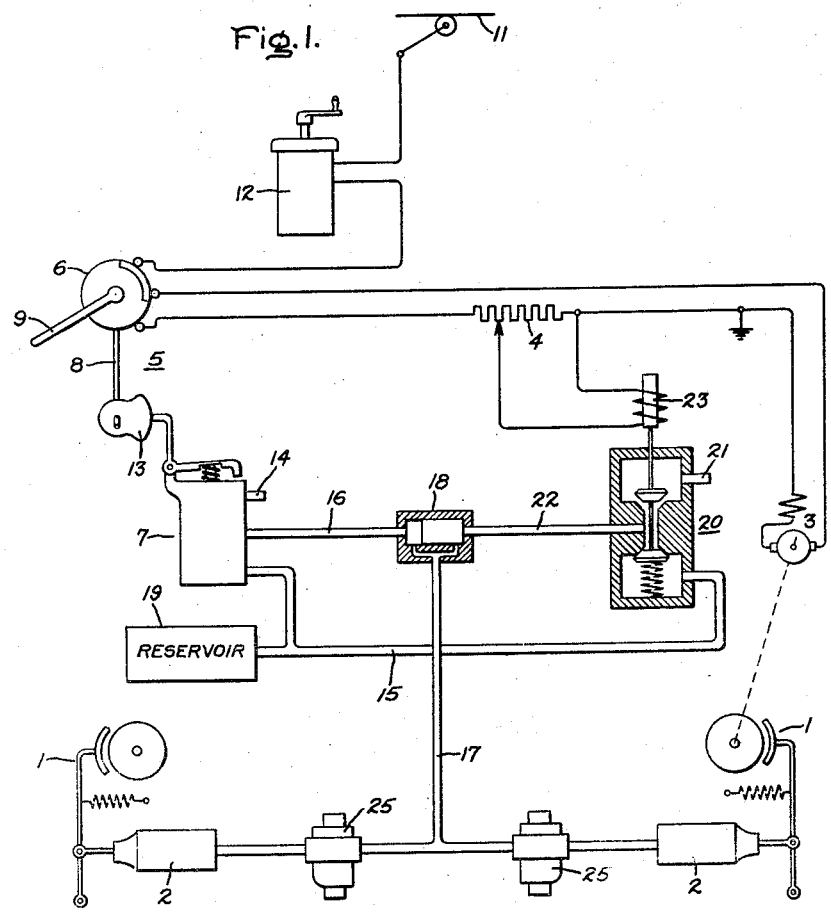
Figure 2:
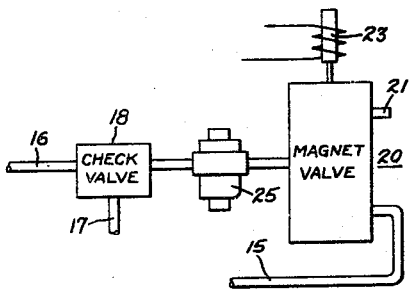

My invention will be better understood from the following description when taken in connection with the accompanying drawing Fig. 1 of which diagrammatically illustrates a vehicle braking system embodying my invention, and Fig. 2 illustrates a modification of a portion of the arrangement shown in Fig. 1, and the scope of my invention will be pointed out in the appended claims.

In Fig. 1, the vehicle braking system includes a spring-applied friction brake for the wheels of the vehicle. This spring-applied friction brake, which may be of any suitable construction examples of which are well known to the art, is arranged to be released whenever the fluid pressure in suitable fluid pressure motors, shown as brake cylinders 2, is above a predetermined value. The vehicle braking system in Fig. 1 also includes an electrodynamic brake comprising a driving motor 3 connected in any suitable manner to the wheels of the vehicle and a resistor 4 which is arranged to be connected in circuit with the motor 3 by contacts of a suitable brake valve device 5 while the vehicle is being braked. As shown, the brake valve device 5 comprises an electrodynamic brake controller section 6 and a fluid pressure section 7. The brake valve device 5 includes an operating shaft 8 which is arranged to be rotated by a suitable handle 9 that is adapted to be moved manually from a release position to a brake application position whenever it is desired to effect a braking operation. In the release position of the brake valve device 5, a circuit is completed between the motor 3 and a supply circuit 11 through contacts of the device. This circuit also includes a motor controller 12 for controlling the current supplied to the motor 3 from the supply circuit 11. In the brake application position of the brake valve 5 the motor 3 is disconnected from the supply circuit 11 and is connected in a closed circuit with the resistor 4 so that, while the vehicle is in motion, motor 3 operates as a generator to supply current through the resistor 4 and thereby exerts a braking effect to retard the speed of the vehicle.

The shaft 8 of the brake valve device 5 is also provided with a cam 13 for actuating control valve of suitable construction, preferably of the self-lapping type such, for example, as that shown in United States Letters Patent 1,874,297 granted August 30, 1932, on an application filed by C. A. Ives. This valve 5 controls communication between an exhaust pipe 14, a main reservoir pipe 15 and a pipe 16 which is connected to the brake cylinder pipe 17 through a double check valve 18 so that, when the brake valve device 5 is in its released position, communication is established between the main reservoir pipe 15 and the pipe 16, and when the brake valve device is in its brake application position, communication is established between pipe 16 and the exhaust pipe 14. The main reservoir pipe 15 is connected to a main reservoir 19, which is supplied with fluid pressure in any suitable manner.

In order to prevent the friction brakes 1 from being applied until after the effectiveness of the electrodynamic brake has decreased below a predetermined value, a magnet valve 20 is provided which controls communication between an exhaust pipe 21, main reservoir pipe 15 and a pipe 22 which is connected to the brake cylinder pipe 17 through the double check valve 18. This double check valve 18 is arranged so that it establishes communication between the brake cylinder pipe 17 and whichever one of the two pipes 16 and 22 is supplied with fluid pressure.

The operating magnet 23 of the magnet valve 20 is connected in any suitable manner so that the magnet valve is maintained in its operated position as long as the current through the resistor 4 is above a predetermined value thereby indicating that the vehicle speed is above a predetermined value. In the particular arrangement shown in the drawing this results is accomplished by connecting the winding of the magnet 23 in parallel with a portion of the resistor 4.

In order to effect a quick application of the friction brake when it is applied in response to the operation of the magnet valve 20, I connect a quick release valve 25 in the communication which is established between the brake cylinders 2 and the exhaust pipe 21 by the magnet valve 20 when it is in its normally deenergized position. The quick release valve 25 may be of any suitable construction such, for example, as shown in United States Patent 2,038,162. In the particular arrangement shown in Fig. 1 a quick release valve 25 is connected in the brake cylinder pipe 17 near each brake cylinder 2 so as to effect a quick release of the fluid pressure therein. However, this feature of my invention is not limited to having the quick release valve connected at this point because the desired result may be accomplished by connecting it at other points such as in pipe 22 as shown in the modification disclosed in Fig. 2.

The operation of the braking system disclosed in Fig. 1 of the drawing is as follows: During the normal operation of the vehicle, the brake valve device 5 is maintained in its release position, which is the position in which it is shown in the drawing. In this release position the brake valve device 5 connects the supply circuit 11 to the motor 3 through the motor controller 12 so that current supplied to the motor 3 can be varied to control the motor speed. With the brake valve 5 in its release position, cam 13 causes the valve 7 to establish a communication between the main reservoir pipe 15 and the pipe 16 so that the double check valve 18 is maintained in the position shown and fluid pressure is supplied to the brake cylinders 2 to release the friction brake.

When it is desired to effect an application of the brakes, brake valve device 5 is moved to the brake application position in which position the motor 3 is disconnected from the supply circuit 11 and is connected in a locking circuit with the resistor 4 so that the motor operates as a generator to maintain the magnet valve 20 in its operated position until the speed of the vehicle decreases below a predetermined value. While in its operated position, the magnet valve 20 establishes communication between the main reservoir pipe 15 and the pipe 22 so that the latter is supplied with fluid under pressure from the main reservoir 19. When the brake valve device 5 is in its brake application position, cam 13 allows the valve 7 to operate so as to cut off communication between the main reservoir pipe 15 and the pipe 16 and to establish communication between the pipe 16 and the exhaust pipe 14. With fluid under pressure in pipe 22 and pipe 16 connected to atmosphere, the double check valve 18 operates to cut off communication between the brake cylinder pipe 17 and the pipe 16 and to establish communication between the brake cylinder pipe 17 and pipe 22. In this manner fluid pressure is maintained in the brake cylinders 2 so as to prevent the friction brake from being applied while the electrodynamic brake is effective. When the speed of the vehicle decreases below a predetermined value so that the energization of the magnet 23 becomes insufficient to maintain the magnet valve 20 in its operated position, this valve returns to its normal position in which communication is established between pipe 22 and the exhaust pipe 21 and communication is cut off between the main reservoir pipe 15 and the pipe 22. As soon as the fluid pressure in pipe 17 starts to exhaust to atmosphere, each quick release valve 25 operates, in a manner well known in the art, to establish a relatively large opening between the associated brake cylinder 2 and atmosphere so that the fluid pressure in the brake cylinder is vented quickly. The venting of the fluid pressure from the brake cylinders effects the operation of the spring-operated friction brake to bring the vehicle to a stop.

While the vehicle is at rest, the friction brake may be released by moving the brake valve device 5 to the release position. When this operation of the brake valve device 5 is effected, the cam 13 operates the valve 7 so that it establishes communication between the main reservoir pipe 15 and the pipe 16. Since the pipe 22 is connected to atmosphere through the magnet valve 20, the double check valve 18 operates to establish communication between pipes 16 and 17 so that fluid pressure is supplied to the brake cylinders 2 to release the friction brake 1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a vehicle baking system, a friction brake, a spring normally biasing said brake to an application position, a fluid pressure operated motor for overcoming the force exerted by said spring so as to release said brake, a source of fluid pressure, an electrodynamic brake, means for controlling said electrodynamic brake, valve means controlled by a condition of said electrodynamic brake for controlling a connection between said motor and said source and between said motor and atmosphere, a manually controlled valve for controlling a connection between said motor and said source and between said motor and atmosphere, and a double check valve controlling the connection between said valve means and said motor and between said manually controlled valve and said motor.

2. In a vehicle braking system, a friction brake, a spring normally biasing said brake to an application position, a fluid pressure operated motor for overcoming the force exerted by said spring so as to release said brake, a source of fluid pressure, an electrodynamic brake, means for controlling said electrodynamic brake, and means controlled by a condition of said electrodynamic brake for controlling a connection between said motor and said source and between said motor and atmosphere to effect the application and release of said friction brake including a quick release valve for controlling the release of fluid from said motor.

3. In a vehicle braking system, a friction brake, a spring normally biasing said brake to an application position, a fluid pressure operated motor for overcoming the force exerted by said spring so as to release said brake, a source of fluid pressure, an electrodynamic brake, means for controlling said electrodynamic brake, valve means controlled by a condition of said electrodynamic brake for controlling a connection between said motor and said source and between said motor and atmosphere, a manually controlled valve for controlling a connection between said motor and said source and between said motor and atmosphere, and a double check valve controlling the connection between said valve means and said motor and between said manually controlled valve and said motor, and a quick release valve controlling the release of fluid from said motor.

HORACE A. DAVIS.